(12) United States Patent
Sembower

(10) Patent No.: US 8,239,183 B2
(45) Date of Patent: Aug. 7, 2012

(54) METHOD AND SYSTEM FOR UNIVERSAL TRANSLATING INFORMATION

(75) Inventor: Neil Sembower, Webster, NY (US)

(73) Assignee: Xerox Corporation, Norwalk, CT (US)

(*) Notice: Subject to any disclaimer, the term of this patent is extended or adjusted under 35 U.S.C. 154(b) by 967 days.

(21) Appl. No.: 11/227,194

(22) Filed: Sep. 16, 2005

(65) Prior Publication Data

US 2007/0067152 A1    Mar. 22, 2007

(51) Int. Cl.
*G06F 17/28*    (2006.01)
(52) U.S. Cl. ............ 704/2; 704/277; 704/3; 704/7; 358/473; 358/1.15; 370/395.31; 455/414.1; 455/422.1; 705/14.39; 709/203; 709/206; 709/227; 711/170; 715/249; 715/255; 715/853
(58) Field of Classification Search ............ 715/249, 715/255, 853; 704/2, 277, 3, 7; 455/566, 455/414.1, 422.1; 358/1.15, 473; 709/206, 709/227, 209; 370/395.31; 705/14.39; 711/170
See application file for complete search history.

(56) References Cited

U.S. PATENT DOCUMENTS

| | | | | |
|---|---|---|---|---|
| 4,509,137 A * | 4/1985 | Yoshida | ............ | 704/7 |
| 5,699,494 A * | 12/1997 | Colbert et al. | ............ | 358/1.15 |
| 5,751,957 A * | 5/1998 | Hiroya et al. | ............ | 709/203 |
| 6,208,435 B1 * | 3/2001 | Zwolinski | ............ | 358/473 |
| 6,473,728 B1 * | 10/2002 | Tognazzini | ............ | 704/3 |
| 6,678,518 B2 * | 1/2004 | Eerola | ............ | 455/422.1 |
| 7,269,173 B2 * | 9/2007 | Iyer et al. | ............ | 370/395.31 |
| 7,409,452 B2 * | 8/2008 | Ragnet et al. | ............ | 709/227 |
| 7,472,247 B2 * | 12/2008 | Vitanov et al. | ............ | 711/170 |
| 2002/0009987 A1 * | 1/2002 | Tobita et al. | ............ | 455/414 |
| 2002/0091738 A1 * | 7/2002 | Rohrabaugh et al. | ......... | 707/517 |
| 2002/0147646 A1 * | 10/2002 | Ogura et al. | ............ | 705/14 |
| 2002/0184319 A1 * | 12/2002 | Willner et al. | ............ | 709/206 |
| 2003/0009462 A1 * | 1/2003 | Burnham | ............ | 707/10 |
| 2003/0225569 A1 * | 12/2003 | Shimamura | ............ | 704/2 |
| 2004/0172586 A1 * | 9/2004 | Ragnet et al. | ............ | 715/500 |
| 2004/0243944 A1 * | 12/2004 | Sabiers et al. | ............ | 715/853 |
| 2005/0038662 A1 * | 2/2005 | Sarich et al. | ............ | 704/277 |
| 2005/0197825 A1 * | 9/2005 | Hagerman et al. | ............ | 704/2 |

* cited by examiner

*Primary Examiner* — Michael Colucci

(74) *Attorney, Agent, or Firm* — MH2 Technology Law Group LLP

(57) ABSTRACT

One embodiment pertains to a method of transferring information. The method includes receiving a request for displayed information on a first device and forming a meta-language message based on the displayed information. The method also includes transferring the meta-language message to a handheld device and converting the meta-language message to a native language message of a user of the handheld device.

15 Claims, 4 Drawing Sheets

METHOD AND SYSTEM FOR UNIVERSAL TRANSLATING INFORMATION

FIELD

This invention relates generally to communicating information. More particularly, the invention relates to translating information from a device to a handheld device.

DESCRIPTION OF THE RELATED ART

Office-support devices, for example copiers, facsimiles, printers, etc., are generally well known. The typical office-support device, e.g., a copier, may also support multiple functions like scanning, a network printer, etc. As a result, these office-support devices are complex electromechanical devices that often require contracting for maintenance support in order to keep these devices operational.

The office support device typically includes a display device. For some conventional copiers, the display device may be a touch screen that provides a mechanism for the user to operate the device. In the event of functional errors, the display device is used to inform the user of the cause of the functional error and/or methods to correct the functional error. In the event of grave errors, the display device may indicate a service call to maintenance support may be needed. Accordingly, these user interfaces at copiers are quite complex.

These office support devices are typically manufactured for a particular market. As a result, the user interfaces to the office support devices are configured to display information in the predominate language of the market, e.g., in the United States, the language of the display is English.

This approach has drawbacks and disadvantages. For instance, an office support device has to be modified to support different international markets. Accordingly, time, engineering and manufacturing resources are devoted to modify the user interfaces to conform to each language of the international market. Thus, the cost of the office support devices increases for international devices.

Moreover, if a visitor from a United States office of an international corporation visits the China office, the visitor may not be able to operate the office support devices because the information displayed on these devices are in Chinese. Accordingly, there is a need for non-native language speakers to communicate with local office support devices without the localization of the device for each potential market.

SUMMARY

One embodiment pertains to a method of transferring information. The method includes receiving a request for displayed information on a first device and forming a meta-language message based on the displayed information. The method also includes transferring the meta-language message to a handheld device and converting the meta-language message to a native language message of a user of the handheld device.

Another embodiment relates to a system for transferring information. The system includes a handheld device and a device that also includes a translator module. The translator module is configured to communicate with the handheld device and includes a wireless interface and a controller. The wireless interface is configured to communicate with the handheld device using a wireless protocol. The controller is configured to translate information being displayed on a display device on the device into a meta-language message and transmitting the meta-language message to the handheld device.

Yet another embodiment pertains to an apparatus for transferring information. The apparatus includes means for receiving a request for displayed information on a first device and means for forming a meta-language message based on the displayed information. The apparatus also includes means for transferring the meta-language message to a handheld device and means for converting the meta-language message to a native language message of a user of the handheld device.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of image output terminals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the invention generally pertain to a system for exchanging information between a handheld device and another device. More particularly, a first device, e.g., a printer, a copier, facsimile, or other similar office support device, may display instructions and/or information in one language. The device includes a translator module configured to communicate with a handheld device, e.g., a laptop, a personal digital assistant, a smart telephone, or other similar computing device via wired and/or wireless protocols. The translator module may be configured to receive a request from the handheld device to transmit the current information being displayed on the first device to the handheld device. The translator module may be configured to convert the information into a meta-language, e.g., XML HTML, SGML, etc. The translator module may then be configured to transmit the converted information to the handheld device. The handheld device may be configured to receive the information in the meta-language. A handheld translator module may be configured to convert the received information in the meta-language format and convert the information in the native language of the handheld user.

Figure 1:
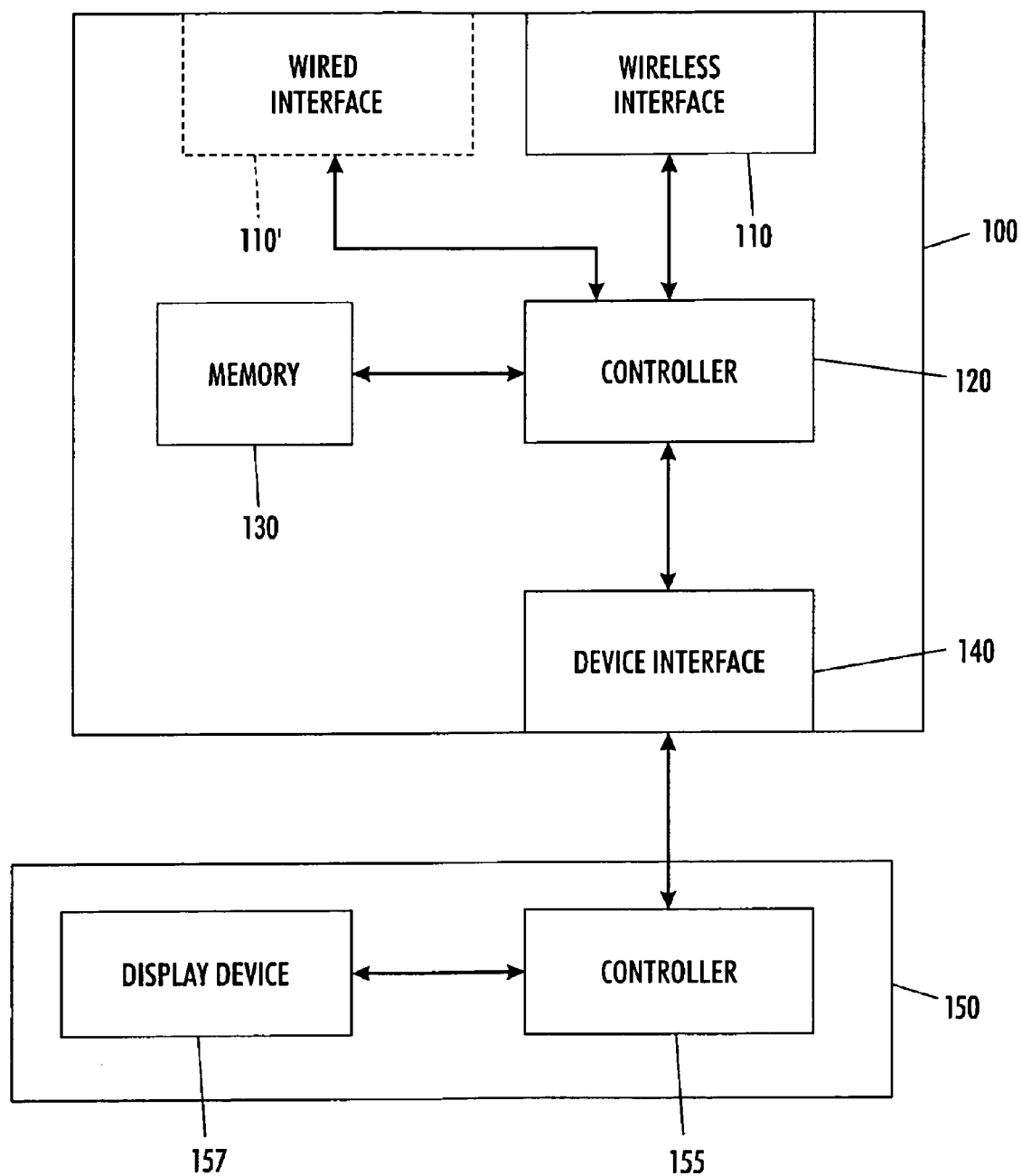
FIG. 1 illustrates a translator module interface with an office support device in accordance with an embodiment.

FIG. 1 illustrates an exemplary embodiment of the translator module 100. It should be readily apparent to those of ordinary skill in the art that the translator module 100 depicted in FIG. 1 represents a generalized schematic illustration and that other components may be added or existing components may be removed or modified.

As shown in FIG. 1, the translator module 100 includes a wireless interface 110, a controller 120, a memory 130, and a device interface 140. The wireless interface 110 may be configured to communicate with handheld devices using a wireless protocol such as IEEE 802.11x, Bluetooth, Cellular Digital Packet-Data, Mobitex, Wireless Application Protocol, Global System for Mobiles, WiFiMax, or combinations thereof. The wireless interface 110 is configured to transmit messages between the translator module 100 and a handheld device, which may be a personal digital assistant, a smart telephone or other similar device (not shown).

In some embodiments, a wired interface 110' may be used in lieu of the wireless interface 100 or in conjunction with the wireless interface 110. The wired interface 110 may be configured to implement a network protocol such as Ethernet, TCP/IP, token ring, Internet or other similar wired protocol. The wired interface 110' may be configured to provide communication services like the wireless interface 110. Thus, the translator module 100 may communicate with the handheld device using wired and/or wireless protocols.

The wireless interface 110 may also be configured to interface with the controller 120. The controller 120 may be the computing platform that executes the software providing the functionality of the translator module 110. The controller 120 may be implemented with a microprocessor, a digital signal processor, an application specific integrated circuit, field programmable gate array or other similar device.

The controller 120 may also be configured to interface with memory 130. The memory 130 may be configured to provide storage of the software that implements the functionality of the translator module 100 and to provide execution space for the software. Memory 130 may be implemented using non-persistent (e.g., dynamic random access memory, DDR-DRAM, etc.), persistent memory (e.g., flash memory, disk drive, etc.) or some combination thereof.

The controller 120 may be further configured to interface with the device interface 140. The device interface 140 may be configured to interface with the office-support device 150, e.g., a copier, a facsimile, etc. In some embodiments, the device interface 140 may directly interface with the controller 155 of the office-support device 150, which then interfaces with the display device 157. Although the embodiment shown in FIG. 1 illustrates a separate module for the translator module 100, it should be readily apparent that the functionality and features associated with the translator module 100 may be integrated into the office-support device 150.

The controller 120 may receive a message from a user of a handheld device requesting that the displayed information on the office-support device be transmitted via the wireless interface, 110. The controller 120 may be configured to query the device for the information being displayed on the display device of the office-support device. The controller 120 may then temporarily store the display information in the memory 130.

The controller 120 may be configured to format a meta-language message based on the stored display information. More particular, the controller 120 may convert the displayed information into a meta-language such as SGML, HTML, XML or some combination thereof. The controller 120 may mark or tag the textual portion of the displayed information with the appropriate syntax of the meta-language. For the graphical portions of the display information, the controller 120 may convert the graphical image to a JPEG, GIF, or other similar graphical format and apply the appropriate syntax to the graphical portions. Subsequently, the controller 120 may then be configured to transmit the meta-language message to the requesting handheld device through the wireless interface 110.

Figure 2:
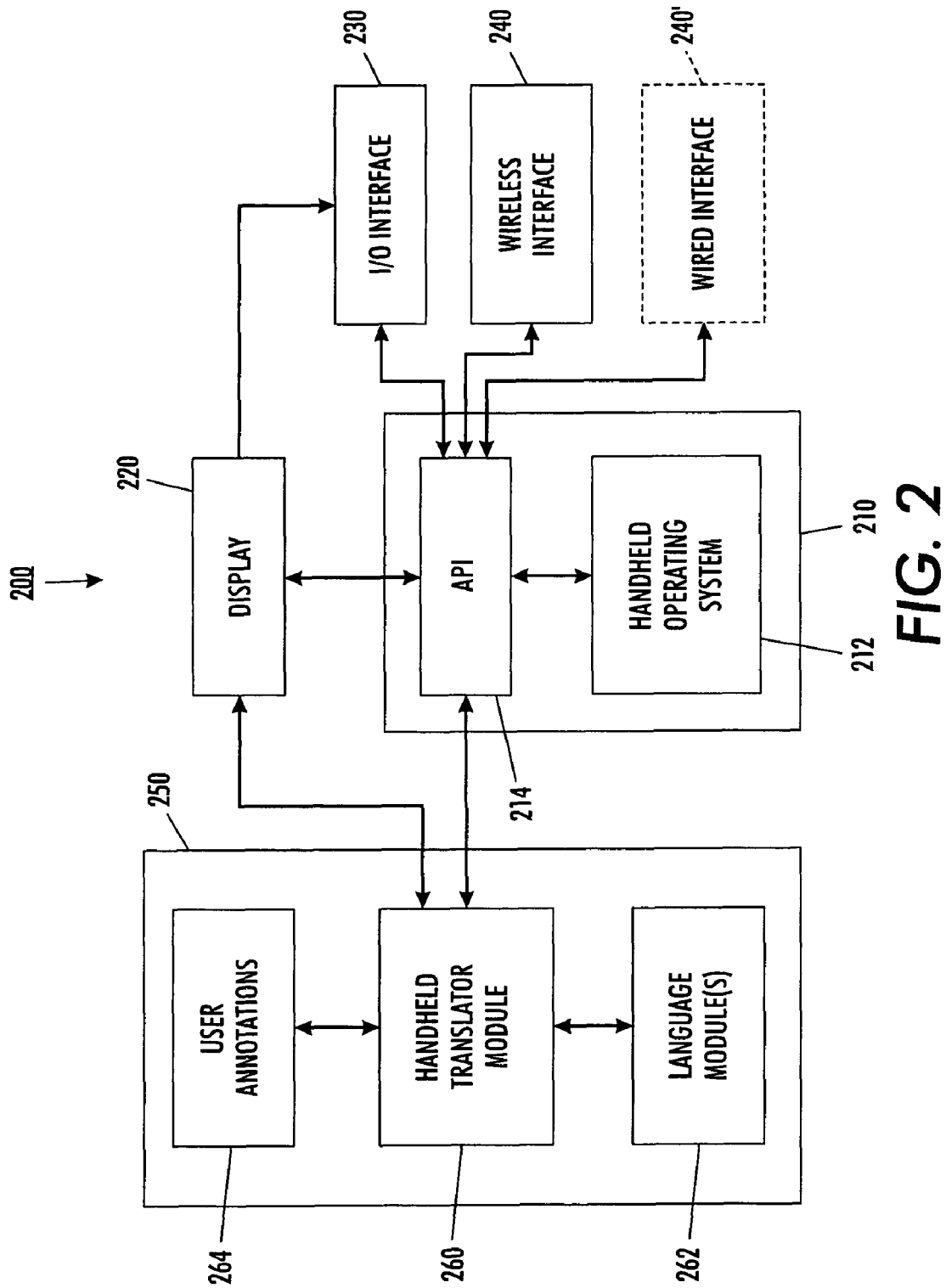
FIG. 2 illustrates a wireless translator module implemented on a wireless handheld device in accordance with another embodiment.

FIG. 2 illustrates an exemplary embodiment of a handheld device 200 with a handheld translator module in accordance with the invention. It should be readily apparent to those of ordinary skill in the art that the translator module 200 depicted in FIG. 2 represents a generalized schematic illustration and that other components may be added or existing components may be removed or modified.

The handheld device 200 includes a processor 210, a display 220, an input/output interface 230 (labeled as "I/O Interface" in FIG. 2), a wireless interface 240, and, optionally, a wired interface 240'. In some embodiments, the I/O interface 230 and the wireless interface 240 may be configured as a single device. In other embodiments, a wired interface 240' may be used in lieu of or in conjunction with the wireless interface 240.

The processor 210 may be configured to execute a handheld operating system 212 and application program interface 214 (labeled as "API" in FIG. 2). The handheld operating system 212 may be implemented using Windows™ CE, PALM™ O/S, Windows™ Smartphone or other similar operating system. The handheld operating system 212 may interface with the API 214. The API 214 may be configured to provide an interface between application programs executing on the handheld device 200, the handheld-operating system 212, and input/output devices.

The handheld operating system 212 may be configured to interface with the display 220 through the API 214. The display 220 may be configured to provide a visual interface for information/data to be displayed for uses of the handheld device 200. The display 220 may also be configured to be touch-sensitive, i.e., receive user input to execute functions for application software programs executing on the handheld device 200.

The handheld operating system 212 may also be configured to interface with the I/O interface 230 through the API 214. The I/O interface 230 may be configured to receive input from input devices located on the handheld device 200, e.g., hot keys, voice recorder, volume control, keyboard, etc. In some embodiments, the user input from the display 220 may be processed by the I/O interface 230.

The handheld operating system 212 may be further configured to interface with the wireless interface 240 and/or wired interface 240'. The wireless interface 240 may be configured to provide a communication channel to wireless network access points and/or ad hoc networks. The wireless interface 240 may be compatible with various wireless network protocols such as IEEE 802.11x, Bluetooth, Cellular Digital Packet Data, Mobitex, Wireless Application Protocol, Global System for Mobiles, or combinations thereof. The wired interface 240' may be compatible with various wired network protocols such as Ethernet, token ring, TCP/IP, or other similar wired protocols.

The handheld operating system 212 may be further configured to interface with the memory 250. The memory 250 may be implemented as form of persistent memory, non-persistent memory or some combination thereof. The memory 250 may be configured to provide storage for the handheld operating system 212, data, and for application programs installed by the user of the handheld device 200.

In some embodiments, the memory 250 may store a computer-readable instance of the handheld translator module 260. The handheld translator module 260 may be configured to receive meta-language messages from an office-support device and convert the received message into the native language of the user of the handheld device 200. More particularly, when a meta-language message is received through the wireless interface 240, the handheld translator module 260 may be configure to temporarily store the received message in memory 250. The handheld translator module 260 may parse the received message searching for the tagged textual information. When the handheld translator module 260 determines that textual information exists in the received meta-language message, the handheld translator module 260 invokes a language module 262 to convert the textual information from the received language to the native language of the user. The language module 262 may be predetermined when the user installed the translator module 260.

In the event that the language module 262 cannot translate a term in the tagged textual information, the handheld translator module 260 may be configured to search the user annotation module 264. The user annotation module 264 may provide a data structure for a user to add the native translation of a term that may be undefined by the language module 262. If a term in the tagged textual information is undefined by the language 262 and the user annotation module 264, the handheld translator module may invoke a user dialog box on the display 220 for the user to add the undefined term.

Subsequently, the handheld translator module 260 may replaced with the tagged textual information with the translated textual information. The graphical information and the translated textual information (if present) are then displayed on the display 220 for the user to view.

Figure 3:
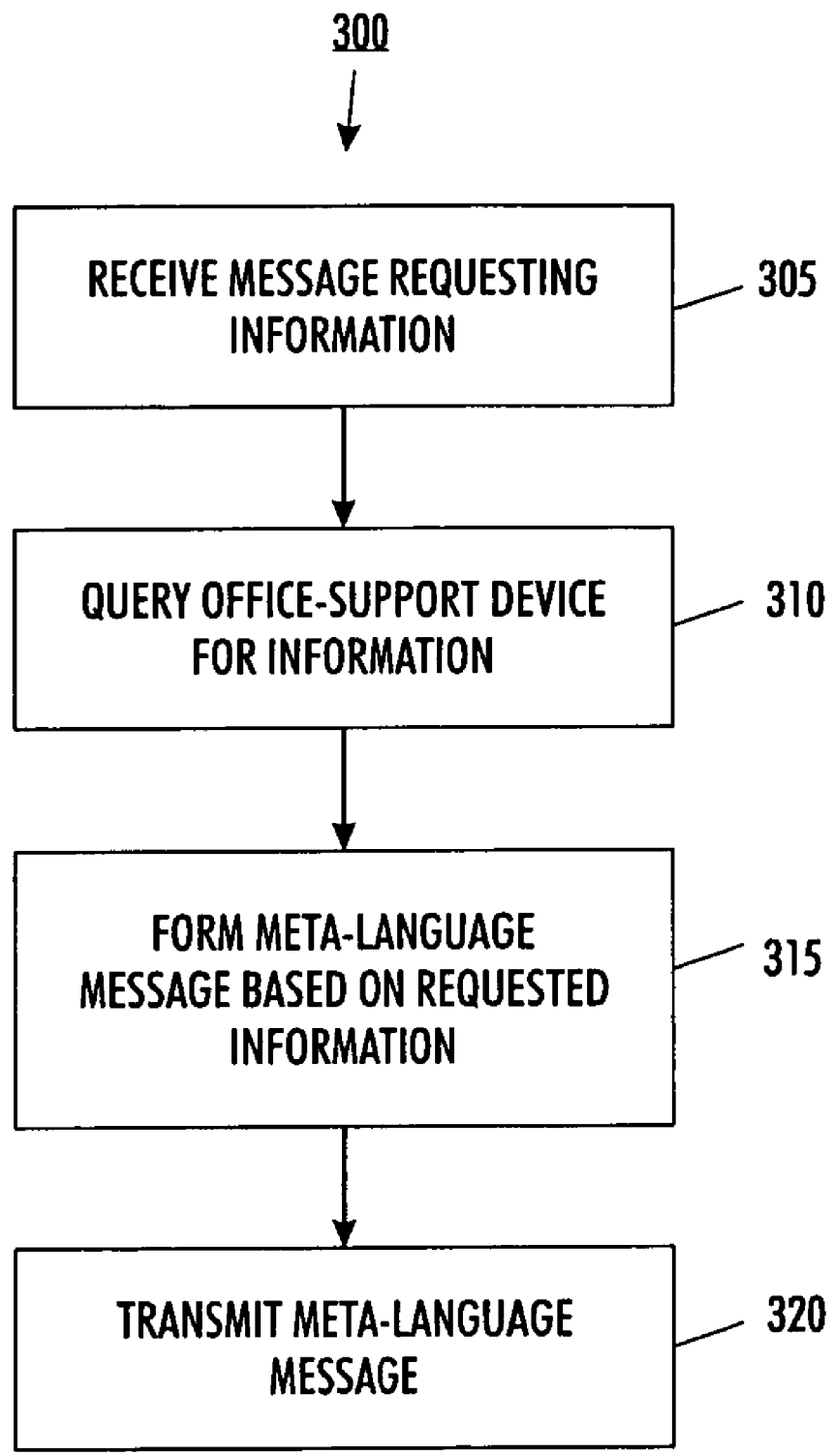
FIG. 3 illustrates an exemplary flow diagram for forming a meta-language message in accordance with yet another embodiment of the invention.

FIG. 3 illustrates an exemplary flow diagram 300 for forming a meta-language message by the office support device in accordance with an embodiment of the invention. It should be readily apparent to those of ordinary skill in the art that the flow diagram 300 represents a generalized illustration and that other steps may be added or existing steps may be removed or modified.

As shown in FIG. 3, the controller 120 may receive a message from a handheld device, e.g., handheld device 200 (shown in FIG. 2), in step 305. The controller 120 may query the office support device 150 for the information being currently being shown on the display device, e.g., display device 157 (shown in FIG. 1). The controller of the office support device, e.g., controller 155, may forward the requested information to the controller 120, where the controller 120 may temporarily store the requested information in memory 130.

In step 315, the controller 120 may form a meta-language message based on the requested information. More particularly, the controller 120 may format the requested information using the syntactic rules of a meta-language, e.g., SGML, HTML or XML to format the requested information for transmission. In some embodiments, the controller 120 may tag the textual information, if any, in the requested information with the appropriate markers indicating text information. The controller 120 may also tag the graphical information, if any, in the requested information with the appropriate markers indicating graphic information. In other embodiments, the controller 120 may convert the graphical information in the requested information into a compatible graphic format such as JPEG, GIF or other similar format.

In step 320, the controller 120 may transmit the meta-language message to the handheld device over the wireless interface 110. Subsequently, the controller 120 may return to an idle state.

Figure 4:
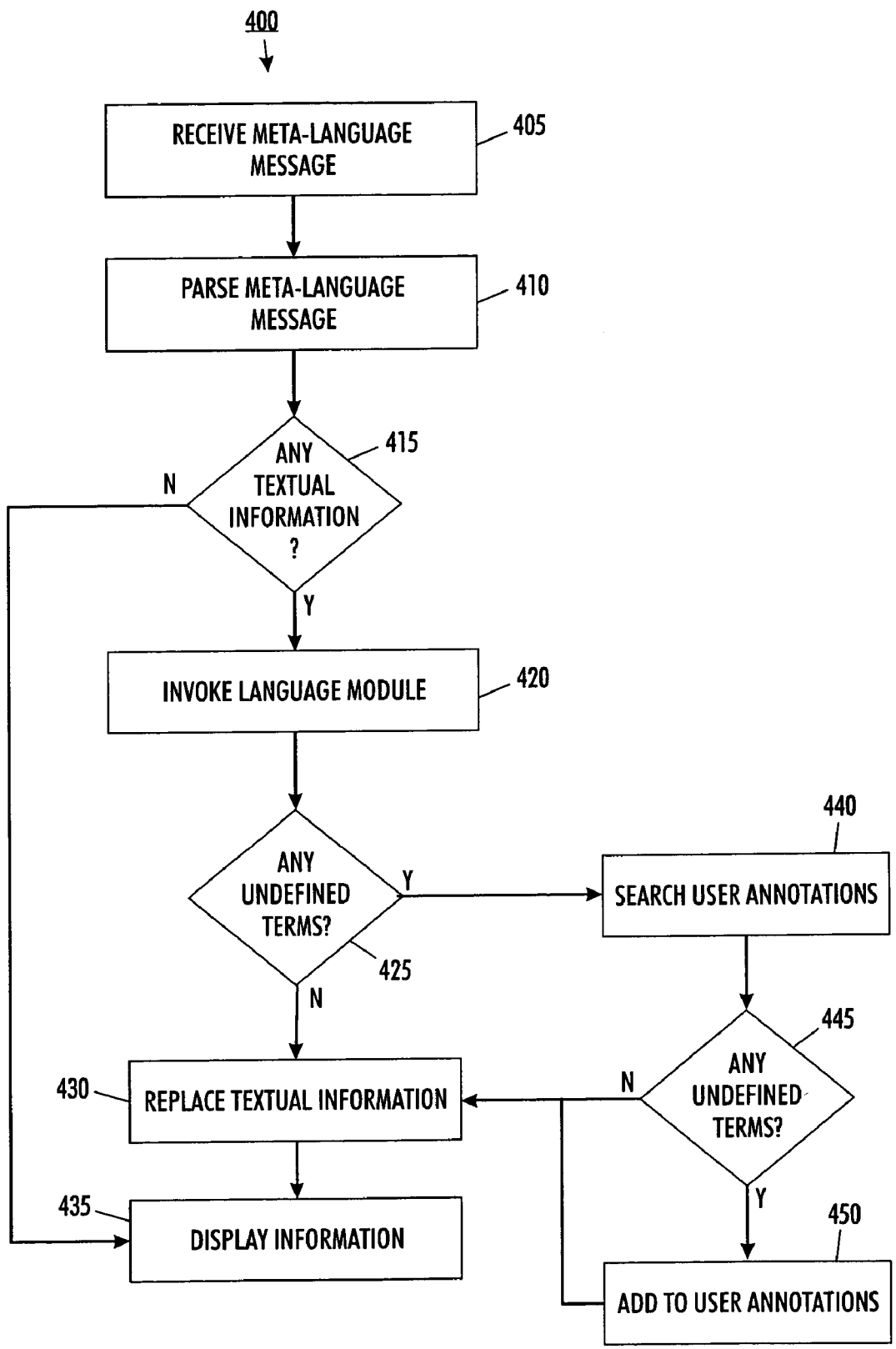
FIG. 4 illustrates an exemplary flow diagram 400 for processing a meta-language message by the handheld device in accordance with yet another embodiment of the invention.

FIG. 4 illustrates an exemplary flow diagram 400 for processing a meta-language message by the handheld device in accordance with an embodiment of the invention. It should be readily apparent to those of ordinary skill in the art that the flow diagram 400 represents a generalized illustration and that other steps may be added or existing steps may be removed or modified.

As shown in FIG. 4, the handheld device, e.g., handheld device 200, (shown in FIG. 2), may receive a meta-language message from an office support device through a translator module, e.g., translator module 100, in step 405.

In step 410, the handheld device may store the message in memory, e.g., memory 250, and invoke the translator module 260. The translator module 260 may be configured to parse the received meta-language message.

In step 415, the translator module 260 may be configured to determine if any textual information was contained in the meta-language message. If the translator module 260 determines that the meta-language message did not contain any textual information, the translator module 260 may be configured to go to the processing associated with step 435, as described below. Otherwise, if the translator module 260 determines that the meta-language message contains textual information, the translator module 260 may be configured to invoke the language module, e.g., language module 262, in step 420. The language module may be configured to translate the terms in the textual information into the native language of the user of the handheld device.

In step 425, the translator module 260 may be configured to determine if there were any undefined terms in the textual information. If the translator module 260 determines that all terms were translated, the translator module 260 may be configured to replace the original textual information with the translated text, in step 430. Subsequently, the translator module 260 may be configured to display the translated information on the display 220 of the handheld device.

Otherwise, returning to step 425, if the translator module 260 determines that undefined terms exist, the translator module 260 may be configured to search the user annotations 264, in step 440.

In step 445, the translator module 260 may be configured to determine whether or not undefined terms still exist after a search of the user annotations 264. If all terms have been defined, the wireless translator module 260 may return to the processing of step 430. Otherwise, if undefined terms still exist after the search of the user annotations, the translator module 260 may be configured to generate a dialog box for the user to manually enter the correct native language term for the undefined term, in step 450. This step repeats itself for all undefined terms found. Subsequently, the translator module 260 may return to the processing of step 430.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of transferring information, the method comprising:
   transmitting, to a first device, a request from a handheld device for information displayed on a display device of the first device, wherein the information is viewable to a user of the handheld device viewing the display device, and wherein the information is not displayed on the handheld device;
   receiving a meta-language message from the first device based on the information; and
   converting, by a translator module of the handheld device, the meta-language message into a native language of the user of the handheld device.

2. The method according to claim 1, further comprising displaying the meta-language message that was converted in the native language of the user on a display device of the handheld device.

3. The method according to claim 1, wherein the meta-language message comprises tagged textual information of the information.

4. The method according to claim 1, wherein the meta-language message comprises tagged graphical information of the information.

5. The method according to claim 3, wherein converting the meta-language message comprises invoking the translator module to convert the tagged textual information into the native language of the user.

6. A system for transferring information, the system comprising:
   a device;
   a handheld device configured to transmit a request to the device for information displayed on a display device of the device, wherein the information is viewable to a user of the handheld device viewing the display device, wherein the information is not displayed on the handheld device, and wherein the handheld device comprises a translator module comprising:
      a wireless interface configured to communicate with the device using a wireless protocol; and
      a controller configured to receive a meta-language message from the device based on the information and translate the meta-language message into a native language of the user of the handheld device.

7. The system according to claim 6, wherein translating the meta-language message comprises converting a textual portion of the meta-language message into the native language of the user of the handheld device.

8. The system according to claim 6, wherein the handheld device is further configured to display the meta-language message that was converted in the native language on an associated display device of the handheld device.

9. The system according to claim 6, wherein the meta-language message comprises textual and graphical information based on a mark-up text language.

10. The system according to claim 6, further comprising a device interface configured to communicate with the display device of the device.

11. An apparatus for transferring information, the apparatus comprising a processor coupled to memory and configured to execute instructions comprising:
    transmitting, to a first device, a request from a handheld device for information displayed on a display device of the first device, wherein the information is viewable to a user of the handheld device viewing the display device, and wherein the information is not displayed on the handheld device;
    receiving a meta-language message from the first device based on the information; and
    converting, by a translator module of the handheld device, the meta-language message into a native language of the user of the handheld device.

12. The apparatus according to claim 11, further comprising displaying the meta-language message that was converted in the native language of the user on a display device of the handheld device.

13. The apparatus according to claim 11, wherein the meta-language message comprises tagged textual information of the information.

14. The apparatus according to claim 11, wherein the meta-language message comprises graphical information of the information.

15. The apparatus according to claim 13, wherein converting the meta-language message comprises invoking the translator module to convert the tagged textual information into the native language of the user.

* * * * *